Oct. 19, 1937.                L. C. IRWIN                2,096,179
                       INSTRUMENT LINK MOVEMENT
                          Filed July 30, 1932
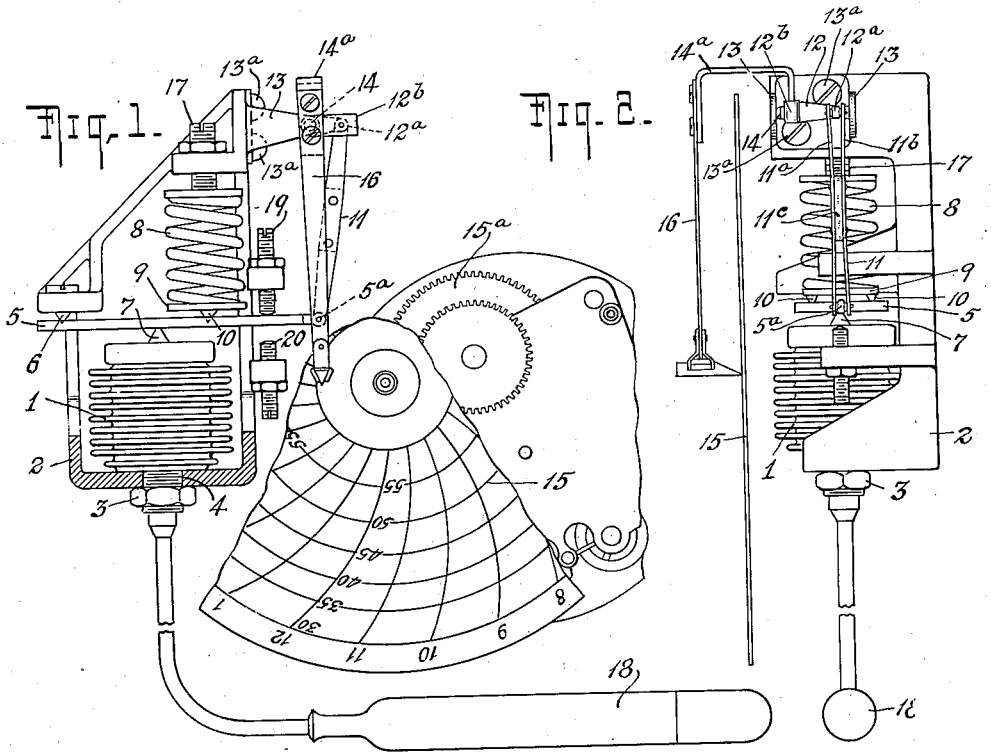
WITNESS
INVENTOR
LAWRENCE C. IRWIN
BY
ATTORNEYS Patented Oct. 19, 1937

2,096,179

UNITED STATES PATENT OFFICE 2,096,179

INSTRUMENT LINK MOVEMENT

Lawrence C. Irwin, Brooklyn, N. Y., assignor to Charles J. Tagliabue Mfg. Co., Brooklyn, N. Y., a corporation of New York Application July 30, 1932, Serial No. 626,834

6 Claims. (Cl. 74—579)

The present invention relates to an improved movement or gearing for instruments in which a system sensitively responsive to minute variations of a condition to be observed, maintained or controlled is connected with a translating system driven by or through the motion of the sensitive system in response to variations of the condition to be observed or controlled, as for example instruments provided with a pointer, pen arm or similar element of temperature or pressure indicating or recording instruments or of indicating or recording controllers. It is the object of the invention to provide a mechanism of this type which is simple in construction and easy of assembly, is capable of exerting the necessary force to operate the pointer or equivalent element, requires no complicated and laborious adjustments and calibrations, establishes a clearanceless constant-friction connection between the sensitive system and the translating system, automatically preservative of such connection notwithstanding wear due to vibration or relative motion of the parts, and can be manufactured on a large scale with a high degree of uniformity and at a low cost.

In the preferred embodiment of the present invention, I employ as a part of the sensitive system a metallic bellows of considerable cross-sectional area, with which coacts a tempered steel spiral spring, for transmitting movement to a pointer or pen arm or other member of the translating device in response to fluctuations in temperature or pressure at a selected place under measurement, control or under both measurement and control. The resultant movement of the mechanism depends almost entirely upon the action of the tempered steel spring since the metallic bellows has comparatively little resistance. Also, due to the comparatively large cross-sectional area of the bellows, the force exerted thereby is considerable, and the same is also direct and positive; in fact, the force that can be exerted by the bellows is sufficiently great to operate also a pilot valve forming part of a controller mechanism. These factors permit the linkages between the bellows and the pointer or pen arm to be made in such a way that they require no special fitting. It is however, essential that the linkage between the sensitive system represented by the bellows and the translating system represented by the pointer or pen arm or other element affected by the sensitive system shall be so contrived and arranged as to maintain constant the relation between the sensitive system and the translating system notwithstanding wear or the effect of vibrations or relative movement of the parts due to other causes.

One of the important features of the invention resides in a novel connection between the actuating bellows and spring and the indicating or recording parts which is capable of resisting the strains incident to the frequent oscillation thereof by the bellows and spring and is capable also of taking up wear automatically while maintaining the relationship of the parts constant, and thereby insuring accuracy of transmission of the impulses from the responsive mechanism to the indicating or recording parts. In the preferred form of the invention, this connection comprises a link arranged between a lever actuated by the bellows and spring and a lever or other movable device connected with or forming part of the indicating or recording element. The link is formed, at least at its ends, of two spaced resilient members which are adapted to be frictionally connected with the other parts under tension in such a way that wear on the connection is absorbed by such resilient members. Thus, the pairs of resilient members at the ends of the link may be sprung over the associated parts which are to be connected by such link, such parts being preferably provided with tapered or convex lugs or projections and the resilient members being provided with recesses or apertures for receiving such lugs or projections, the parts being so dimensioned that in the assembled state the resilient members are under tension.

Other features and advantages of the invention will become evident from the following description, and the elements of novelty will be pointed out in the appended claims.

In the accompanying drawing is illustrated a particular form of the invention without in any way defining the scope thereof. In said drawing, Fig. 1 is a plan view of an indicator movement embodying the present invention; Fig. 2 is an end view thereof; and Fig. 3 shows a detail in perspective.

As shown in Figs. 1 and 2, a metallic bellows 1 is securely fastened to a support or frame 2 by means of a nut 3 mounted upon a threaded hollow stem 4 projecting from the bottom of the bellows and passing through a suitable opening in the frame. A lever 5 is hinged upon a pivot composed of a pair of screws 6 having pointed ends engaged by the lever, the latter being urged upwardly by means of a lug 7 fixed to the upper portion of the bellows. This movement is opposed by a spring 8 which rests upon a plate 9 provided with a pointed projection 10 bearing upon the upper face of the lever. The right-hand end of lever 5 which is the motion-transmitting member of the sensitive system and which moves in response to variations in the condition to be observed, recorded, or controlled, is provided with an ear 5a upon which is pivoted a link 11 whose upper end is pivotally connected with an arm 12a of a rocker member 12 mounted for oscillation upon a shaft 14 journalled in the horizontally disposed arms 13 of a U-shaped bracket secured to the main frame 2 in any suitable manner, as by screws 13a. The arm 12a of the rocker member 12 is the element of the translating system which is driven by or through the motion of the lever 5 of the sensitive system. The member 12 is of sheet metal and is reversely bent at 12b and has attached thereto, in line with the shaft 14, an arm 14a of inverted U-shape which is bent around the edge of the chart 15 and has attached thereto a pen or stylus 16 which engages the chart (see Fig. 2). The chart is mounted upon a plate (not shown) which is rotated in known manner by a clock mechanism 15a.

The link 11 is composed of two flexible plates 11a and 11b held in spaced apart relationship by a block 11c through which pass rivets 11d. Both the ear 5a and arm 12a are tapered or pointed at both faces, or are provided with projecting pins or studs, having tapered or conical portions 5b, 12c, the four projections 5b, and 12c all lying in an approximately common plane so as to avoid torsion or twisting strains on the link 11 when the free ends of the plates 11a and 11b are sprung over such faces or pins. The plates are provided with suitable depressions or apertures 11e for receiving and holding the ends of the pins (see Fig. 3). When the parts are assembled, the plates 11a and 11b bear against the tapered portions 5b, 12c with a light pressure. The connection shown in Fig. 3 is not only easy of assembly, but automatically takes up wear caused by vibration of the instrument because it is clearanceless. The sensitivity of the connection is preserved by reason of the fact that the friction between the moving parts is practically constant, the blade portions 11a and 11b being biased toward each other and therefore merely moving toward the base of the tapered portions 5b and 12c as wear, occasioned by vibration or otherwise, occurs at the connection. This connection may be employed with mechanism other than the specific type illustrated, for example, in instruments utilizing other kinds of actuating means, such as a Bourdon spring.

The pressure of the spring 8 may be adjusted by a screw 17. By proper rotation of the screw, the spring may be set to a definite point, indicated by the pointer 16 on the chart 15, corresponding to the temperature of the thermostatic bulb 18 which is located at the place whose temperature is being measured or recorded. Two stops in the form of adjustable screws 19 and 20 are mounted upon the frame 2 and are adjusted to limit the movement of the pen arm 16 to the range of the chart.

It is to be noted that the improved movement illustrated in Figs. 1 and 2 can be utilized for operating the pointer of an indicating instrument with the aid of a rack and pinion, as the force exerted by the bellows is very considerable and suffices for the operation of such pointer.

The mechanisms above described are characterized by extreme simplicity and ease of assembly, as it is necessary only to mount the several elements upon their pivots and to make a single adjustment of the spring 8. The construction of lever 11 in the form of two spaced flexible plates renders the connection thereof with the lever 5 and with the member 12 (Fig. 1) a very simple matter. The bellows 1, as already stated, is capable of exerting a strong force and can thus operate the train of linkage in a very effective and reliable manner. As both the bellows 1 and spring 8 can be manufactured on a large scale with a high degree of uniformity, the parts can be standardized and accurate instruments obtained with a minimum of calibration and adjustment.

It will be understood that while I have described the bellows 1 as being connected with a thermostatic bulb 18, such bellows can be made responsive also to the pressure at any particular point by being directly connected to the pressure apparatus.

It will be evident that my improved indicator movement may be utilized with instruments other than that illustrated and that variations from the specific example described hereinabove may be resorted to within the scope of the appended claims without departing from the spirit of the invention.

I claim:

1. In an indicating, controlling or recording instrument having mechanism sensitive to changes in a physical condition and thus generally subjected to almost constant movement, a movable indicating, controlling or recording member, and a movable element arranged to partake of the oscillating movement of said sensitive mechanism; a connection between said element and member comprising a link consisting of spring plates and a connection at approximately their central portions to assemble them into the link construction, said plates having apertures at the spring ends thereof, and tapered bearing members at the ends of said element and member the apertured spring ends of the plates being continuously biased toward the tapered bearing member and engaging said members under such bias, said spring plates being free to move under the influence of their bias to take up wear at said tapered bearing members whereby play is eliminated at the connections and the original relationship between the parts and hence the original calibration of the instrument is preserved.

2. In a precision instrument having a sensitive system responsive to minute variations of a condition to be observed, said system including a member movable in response to such variations, a translating system including an element driven by or through motion of said member in response to variations in said condition and a connection between said member of said sensitive system and the driven member of said translating system, said connection comprising a pair of oppositely extending tapered projections on the said member of the sensitive system, a pair of oppositely extending tapered projections on the driven member of the translating system, said projections all lying in an approximately common plane and a link having a pair of flexible apertured blade portions engaging the tapered projections on the member of the sensitive system, a pair of apertured blade portions engaging the tapered projections on the driven member of the translating system and an approximately central connection between the blade portions, said tapered projections in each case extending into the apertures of the blade portions and each blade portion being continuously biased toward the tapered projection engaged by it in their interengaged position to provide a clearanceless constant-friction connection between the sensitive system and the translating system, automatically preservative of such connection notwithstanding wear due to vibration or otherwise induced relative motion of the engaging tapered projections and apertured blades.

3. In a precision instrument, a member movable in response to variations, a driven member, a link member and pairs of bearing assemblies operatively connecting said members, each pair of bearing assemblies having a male element consisting of a reduced diameter end portion and an adjacent tapered portion, and a female element having an aperture slightly larger than said reduced portion, and said link including means for biasing each of said apertures against the tapered portion of its mating element.

4. In a precision instrument, a driving member oscillatable about an axis, a driven member oscillatable about an axis parallel to said first mentioned axis, a link, and bearing assemblies connecting each end of the link with said driving and driven members, each bearing assembly consisting of a pair of male tapered elements and a pair of apertured bearings cooperating with said tapered elements, and said link including resilient means for axially biasing said apertured bearings toward said tapered elements.

5. In a precision instrument, the combination of a driving and a driven member, a link member pivotally connecting said members, and a pivotal connection between each of said driving and driven members and said link members, said pivotal connection including a stud attached to one member with its axis in the pivotal line of said connection and shaped to taper down from its member to a reduced-diameter substantially cylindrical end portion, and a bearing upon the coacting other of said members and having an aperture only slightly larger than said reduced stud end portion, and said link member including means for biasing said bearing against said tapered stud.

6. In a precision instrument, the combination of a driving and a driven member, a link and a substantially symmetrical pivotal connection between said link and each of said members including an aperture with its axis in the pivotal line of the connection and a stud having a tapered portion, said link including a plate carrying said aperture and means for biasing said apertured plate against said tapered portion of said stud.

LAWRENCE C. IRWIN.